US012582994B2

(12) United States Patent
Blanke

(10) Patent No.: US 12,582,994 B2
(45) Date of Patent: Mar. 24, 2026

(54) MODULAR SHREDDER RING FOR IMPLEMENTATION IN WASTE DISPOSER AND RELATED METHOD

(71) Applicant: INSINKERATOR LLC, Benton Harbor, MI (US)

(72) Inventor: Brandon R. Blanke, West Allis, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 334 days.

(21) Appl. No.: 18/496,437

(22) Filed: Oct. 27, 2023

(65) Prior Publication Data

US 2025/0135462 A1 May 1, 2025

(51) Int. Cl.
*B02C 17/20* (2006.01)
*B02C 17/00* (2006.01)

(52) U.S. Cl.
CPC ............ *B02C 17/20* (2013.01); *B02C 17/002* (2013.01); *B02C 2201/06* (2013.01)

(58) Field of Classification Search
CPC ............ B02C 18/0084; B02C 18/0092; B02C 18/062; B02C 18/083; B02C 18/182; B02C 18/184
See application file for complete search history.

(56) References Cited

U.S. PATENT DOCUMENTS

| | | | | |
|---|---|---|---|---|
| 7,753,297 B2 * | 7/2010 | Hanson | B02C 18/062 | 241/46.013 |
| 8,146,843 B2 * | 4/2012 | Ye | E03C 1/2665 | 241/46.013 |
| 8,500,050 B2 * | 8/2013 | Ryder | E03C 1/2665 | 241/86.1 |
| 11,286,654 B2 * | 3/2022 | Rubin | E03C 1/2665 | |
| 2022/0274119 A1 * | 9/2022 | Sandoval | E03C 1/2665 | |

* cited by examiner

*Primary Examiner* — Matthew Katcoff
(74) *Attorney, Agent, or Firm* — Brooks Kushman P.C.

(57) ABSTRACT

Modular shredding rings for implementation in waste disposers, such as food waste disposers, as well as waste disposers employing such modular shredder rings and related methods of operating and assembling, are disclosed herein. In an example embodiment, a food waste disposer includes a food conveying section, a motor section, and a grinding section that are all supported by or formed within a housing. The grinding section includes a rotating plate and a modular shredder ring, the modular shredder ring including an annular support structure and a plurality of shredder modules mounted upon or coupled to the annular support structure. Additionally, the respective shredder modules are respectively positioned along respective different portions of a radially-inwardly-facing annular surface of the annular support structure. Further, each of the respective shredder modules includes one or more respective first contacting formations that at least partly define one or more respective first spaces.

20 Claims, 4 Drawing Sheets

MODULAR SHREDDER RING FOR IMPLEMENTATION IN WASTE DISPOSER AND RELATED METHOD

FIELD

The present disclosure relates to grinding mechanisms or systems within waste disposers such as food waste disposers and, more particularly, to shredder rings or similar structures or features within such waste disposers, as well as to related methods of operating and implementing same.

BACKGROUND

Food waste disposers are used to comminute food scraps into particles small enough to pass through household drain plumbing. A food waste disposer typically includes a primary inlet along the top of the food waste disposer at which the food waste disposer receives water and food scraps from a sink, and also a primary outlet at which food waste and water are output from the food waste disposer. A food waste disposer can be understood as including a food conveying section, a motor section, and a grinding section. The motor section includes a motor, such as an inductive motor or permanent magnet motor, which operates to impart rotational movement to a motor shaft to operate the grinding section. The grinding section of a food waste disposer often can employ a rotating plate, lugs, and a stationary shredder ring. Also, the stationary shredder ring typically has a plurality of teeth and, by virtue of these teeth, can additionally be understood to constitute a cylindrical shredder blade.

The stationary shredder ring generally takes the form of a cylindrical wall that circumferentially surrounds, and generally extends upward from the circumference of, the rotating plate. The rotating plate is coupled to the motor of the motor section so as to rotate in response to motor rotation, and the lugs mounted on the rotating plate rotate along with rotation of the rotating plate. Centrifugal forces associated with rotation of the rotating plate, along with forces imparted by the lugs, tend to cause food scraps to be directed or projected radially outward toward the stationary shredder ring. Upon impacting and contacting the teeth formed along the stationary shredder ring, the food scraps are comminuted into particles of the desired small size. The particles then pass through gaps between the teeth of the stationary shredder ring, and eventually pass to and through the primary outlet and out of the food waste disposer.

Notwithstanding the effectiveness of many conventional food waste disposers in terms of employing stationary shredder rings to comminute food waste material, conventional food waste disposers do experience some limitations in terms of how effectively those foods waste disposers are able to comminute food. In particular, even if the teeth or blade portions that are provided as part of a stationary shredder ring are effective in achieving desired comminution of certain types of food waste material, those teeth or blade portions may not be equally or sufficiently effective in achieving desired comminution of other types of food waste material. Changes in the waste material received by food waste disposers, or other changes in the operating circumstances experienced by food waste disposers, can result in diminished grind performance by conventional food waste disposer plates with conventional shredder plates.

Further, it can be complicated and/or costly to manufacture, or to implement within food waste disposers, different stationary shredder rings having different respective characteristics that may respectively be suited for achieving different respective operational behaviors or for use in regard to different respective types of food waste material. Indeed, it may be complicated and/or costly to switch between manufacturing a first type of stationary shredder ring having a first type of tooth arrangement and manufacturing a second type of stationary shredder ring having a second type of tooth arrangement. Also, many conventional stationary shredder rings employ teeth that are arranged in accordance with a particular repeating tooth pattern around the circumference of the stationary shredder ring. Manufacturing of such a stationary shredder ring may be relatively cost-effective where the tooth pattern is consistent around the ring. However, it may be complicated and/or costly to manufacture a stationary shredder ring in which different forms or types of teeth are arranged at different locations around the stationary shredder ring.

For at least one or more of these reasons, or one or more other reasons, it would therefore be advantageous if improved grinding sections within waste disposers such food waste disposers, and/or improved shedder rings of such grinding sections, and/or improved methods of operating and/or implementing same, could be developed, so as to address any one or more of the concerns discussed above or to address one or more other concerns or provide one or more benefits.

BRIEF SUMMARY

In at least some example embodiments, the present disclosure relates to a food waste disposer. The food waste disposer includes a housing, and a food conveying section, a motor section, and a grinding section between the food conveying section and the motor section, where the food conveying section, the motor section, and the grinding section are all supported by or formed within the housing. The grinding section includes a rotating plate and a modular shredder ring, the modular shredder ring including an annular support structure and a plurality of shredder modules mounted upon or coupled to the annular support structure. Additionally, the respective shredder modules of the plurality of shredder modules are respectively positioned along respective different portions of a radially-inwardly-facing annular surface of the annular support structure. Further, each of the respective shredder modules includes one or more respective first contacting formations that at least partly define one or more respective first spaces.

Also, in at least some example embodiments, the present disclosure relates to a modular shredder ring for implementation in a waste disposer. The modular shredder ring includes an annular support structure, and a plurality of shredder modules mounted upon or coupled to the annular support structure. The respective shredder modules of the plurality of shredder modules are respectively positioned along respective different portions of a radially-inwardly-facing annular surface of the annular support structure. Further, each of the respective shredder modules includes one or more respective first contacting formations that at least partly define one or more respective first spaces.

Additionally, in at least some further example embodiments, the present disclosure relates to a method of operating a food waste disposer. The method includes providing the food waste disposer with a first modular shredder ring implemented therein, the first modular shredder ring having a first plurality of shredder modules coupled to an annular support structure. The method also includes removing the first modular shredder ring from a housing portion of the food waste disposer. The method additionally includes installing a different modular shredder ring within the housing portion of the food waste disposer, where the different modular shredder ring is either a second modular shredder ring or a modified version of the first modular shredder ring, and where the different modular shredder ring or modified version of the first modular shredder ring has a second plurality of shredder modules that at least partly differs from the first plurality of shredder modules.

BRIEF DESCRIPTION OF THE DRAWINGS

Embodiments of shredder rings and portions thereof as may be implemented in grinding sections of waste disposers such as food waste disposers (or systems including waste disposers), waste disposers employing shredder rings and portions thereof, and related methods of operation and implementation, are disclosed with reference to the accompanying drawings and are for illustrative purposes only. The systems, apparatuses, devices, components, processes, and methods encompassed herein are not limited in their applications to the details of construction, arrangements of components, or other aspects or features illustrated in the drawings, but rather such systems and methods encompassed herein include other embodiments or are capable of being practiced or carried out in other various ways. Like reference numerals are used to indicate like components. In the drawings.

DETAILED DESCRIPTION

Figure 2:
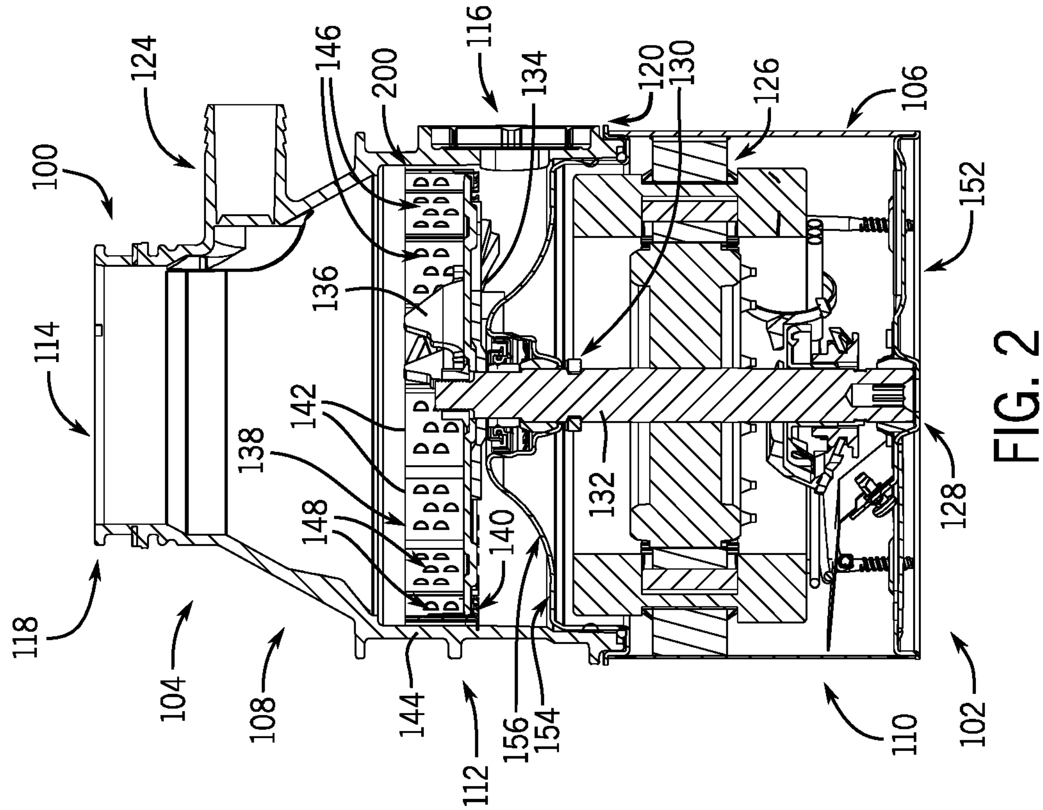
FIG. 2 is a cross-sectional view of the food waste disposer of FIG. 1, taken along a line 2-2 of FIG. 1.

The present inventor has recognized that conventional grinding sections of conventional food waste disposers are typically limited in terms of the manner in which teeth or blade portions are provided around the stationary shredder ring and consequently limited in terms of their performance. Indeed, typically the teeth or blade portions of such conventional grinding sections are formed in a repetitive manner around the entire circumferential extent of the stationary shredder ring. Further, when such conventional grinding sections of such conventional food waste disposers are implemented, the stationary shredder plates within those food waste disposers are usually fixed within the food waste disposers. Consequently, even though those stationary shredder plates with their particular teeth or blade portions can be effective in achieving desired communition of food waste material in some circumstances, the performance of conventional grinding sections employing such stationary shredder rings is typically restricted. Indeed, due to the fixed, repetitive nature of those stationary shredder rings and the teeth or blade portions thereof, changes in the operating circumstances or the waste material received by the food waste disposers can result in diminished grind performance by those shredder plates.

In view of the above, the present inventor has recognized that it would be advantageous if the stationary shredder ring in a food waste disposer (or waste disposer) can be implemented in a manner that facilitates achieving desired operating (e.g., grinding) behaviors or characteristics within the food waste disposer, and/or facilitates modifying the operating (e.g., grinding) behaviors or characteristics within the food waste disposer, to suit different waste material(s) that may be received by the food waste disposer and/or other operational circumstances or conditions. The present inventor has further recognized that a stationary shredder ring for a food waste disposer (or other waste disposer) that achieves one or more such manners of advantageous behavior (and/or achieves other advantages) can be provided, in least some embodiments encompassed herein, by forming or implementing the stationary shredder ring through the use of shredder modules that are respectively configured to occupy only respective portions of the radially-inwardly-facing surface(s) of the stationary shredder ring, and that are respectively positioned at different locations around the shredder ring so as to establish an overall shredder profile (or shredder ring profile).

In at least some such embodiments, the shredder modules can possibly take on (or be) any of a variety of forms or types (e.g., forms or types having different blade characteristics) so that, depending upon which shredder modules are provided on a given shredder ring, the shredder ring can provide any of a variety of desired shredding or other operational characteristics or behaviors during operation of a food waste disposer in which it is implemented. Also, in at least some such embodiments, one or more of the shredder modules that are implemented on a given shredder ring can be modified, or replaced by other shredder module(s), as to change or adjust the shredding or other operational characteristics or behaviors that are (or would be) provided by the shredding ring during operation of a food waste disposer in which it is implemented.

Figure 1:
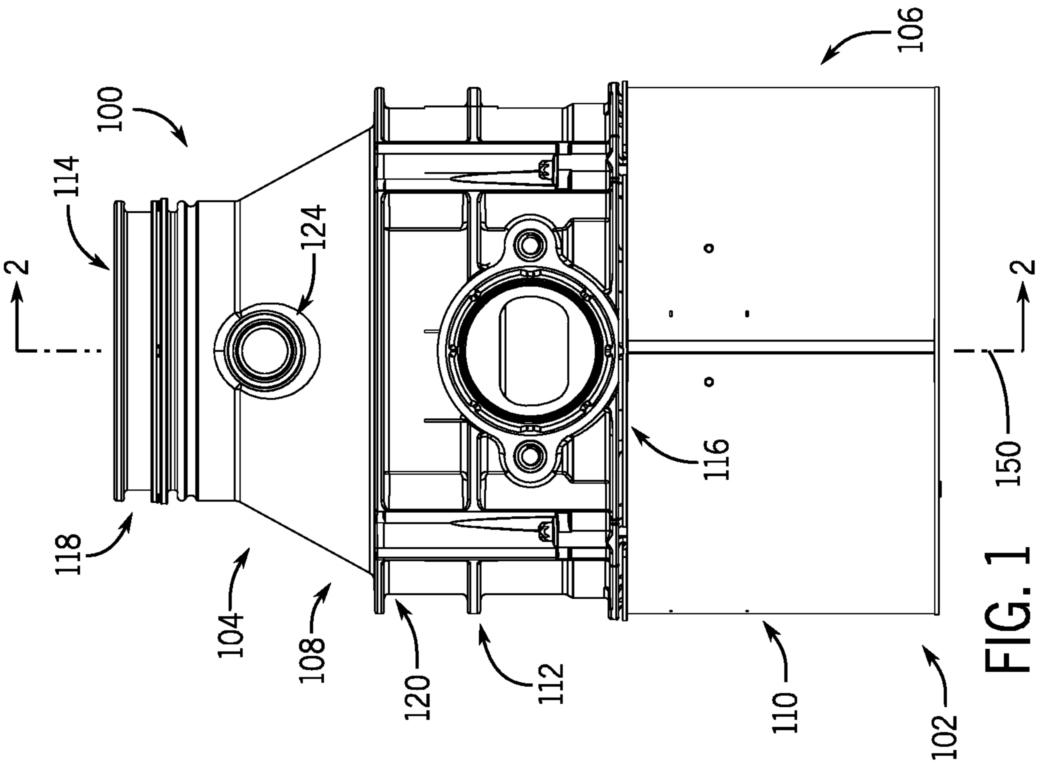
FIG. 1 is a front elevation view of a food waste disposer that includes a grinding section having a modular shredder ring, in accordance with an example embodiment.

Referring to FIG. 1 and FIG. 2, respectively, a front elevation view and a cross-sectional view, respectively, of a food waste disposer 100 having a modular shredder ring 200 (see FIG. 2) in accordance with an example embodiment herein are shown. The particular cross-sectional view provided in FIG. 2 is taken along a line 2-2 extending along a central axis 150 of the food waste disposer 100. As illustrated, the food waste disposer 100 includes a housing 102 having a top housing portion or upper enclosure 104 and a bottom housing portion 106. Also, the food waste disposer 100 can be understood as including a food conveying section 108, a motor section 110, and a grinding section 112. The food conveying section 108 is generally positioned at a region at or near the top of the food waste disposer 100, within the upper enclosure 104, and the motor section 110 is generally positioned at a location corresponding to, and within, the bottom housing portion 106. The grinding section 112 is disposed, within the housing (e.g., within the upper enclosure 104 as illustrated) between the food conveying section 108 and the motor section 110.

Further as shown, the food waste disposer 100 includes a primary input port or inlet 114 and a primary output port or outlet 116. The primary inlet 114 is positioned along or proximate to a top end 118 of the food waste disposer 100, and is configured to receive water and food scraps from a sink (not shown) to which the food waste disposer is mounted during operation of the food waste disposer. The primary outlet 116 is formed along a first sidewall portion 120 of the upper enclosure 104, proximate a junction between the upper enclosure and the bottom housing portion 106, and is configured to allow for food waste and water to pass from the grinding section 112 out from the food waste disposer 100 during operation. Additionally as shown, the food waste disposer 100 also includes a dishwasher inlet 124 that is an auxiliary port of the food waste disposer and that also is formed along, and as part of, the first sidewall portion 120.

Further as shown particularly in FIG. 2, in the present embodiment the motor section 110 includes a motor 126 that is supported between a lower end frame (LEF) 152 and an upper end frame (UEF) 154 of the food waste disposer 100 by a first bearing 128 at or proximate to the LEF and a second bearing 130 at or proximate to the UEF. The first bearing 128 and second bearing 130 particularly are configured to allow for a motor shaft 132 of the motor 126 to rotate relative to other portions (e.g., the housing 102, the LEF 152, and the UEF 154) of the food waste disposer 100, about the central axis 150. As shown, the motor shaft 132 particularly extends upward so as to pass through the UEF 154, which effectively serves as the uppermost portion of the motor section 110 and as the boundary between the motor section and the grinding section 112. The motor 126 can for example be an inductive motor or, alternatively for example, can be a permanent magnet motor.

Additionally as shown particularly in FIG. 2, the grinding section 112 includes a rotating plate 134, a plurality of lugs 136 (one of which is particularly evident in FIG. 2), and a stationary shredder ring that, in the present embodiment, is a modular stationary shredder ring (or more simply a modular shredder ring) 138. The modular shredder ring 138 is a generally cylindrical structure that circumferentially surrounds, and generally extends upward from, an outer circumference 140 of the rotating plate 134. As will be described in further detail, the modular shredder ring 138 includes a plurality of shredder modules 142 that are fixedly supported in relation to an outer cylindrical housing 144 of the modular shredder ring. Each of the shredder modules 142 includes one or more respective first contacting formations 146. The first contacting formations 146 can generally include, for example, edges, flanges, or other wall or surface portions of the shredder modules 142 that can contact food, water, or other material within the food waste disposer 100 during operation. Additionally, each of the shredder modules 142 includes one or more respective first spaces 148, which are partly or entirely defined by the one or more respective contacting formations 146 of the respective shredder module. The first contacting formations 146 and/or the first spaces 148 can in some embodiments be understood to form shredder blades.

It will be appreciated that the food waste disposer 100 is configured to receive water and food scraps from a sink (not shown). During operation of the food waste disposer 100, when the motor 126 is actuated to rotate during operation of the food waste disposer 100, the motor operates to impart rotational movement to the motor shaft 132, which in turn imparts that rotational movement to the rotating plate 134 of the grinding section 112. As this occurs, centrifugal forces associated with rotation of the rotating plate 134, along with forces imparted by the lugs 136 that rotate along with the rotating plate, tend to cause any food scraps (and associated water) that are within the grinding section 112 to be directed or projected radially outward toward the modular shredder ring 138.

Upon impacting the first contacting formations 146 formed within the shredder modules 142 of the modular shredder ring 138, the food scraps are comminuted into particles of the desired small size. The particles then pass through the first spaces 148 provided in the shredder modules 142. After passing through the first spaces 148, the particles (and associated water or other fluids) proceed downward toward an upper surface 156 of the UEF 154 of the motor section 110, and further proceed circumferentially and radially outward so as to reach the primary outlet 116, by which those particles (and associated water or other fluids) exit the food waste disposer 100.

Figure 3:
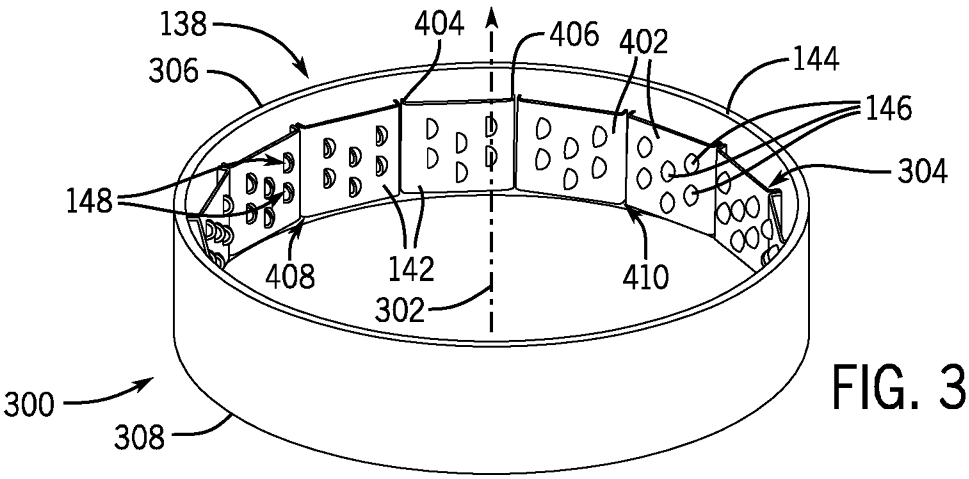
FIG. 3 is a front perspective (or isometric) view of a modular shredder ring of the food waste disposer of FIG. 1 and FIG. 2.
Figure 4:
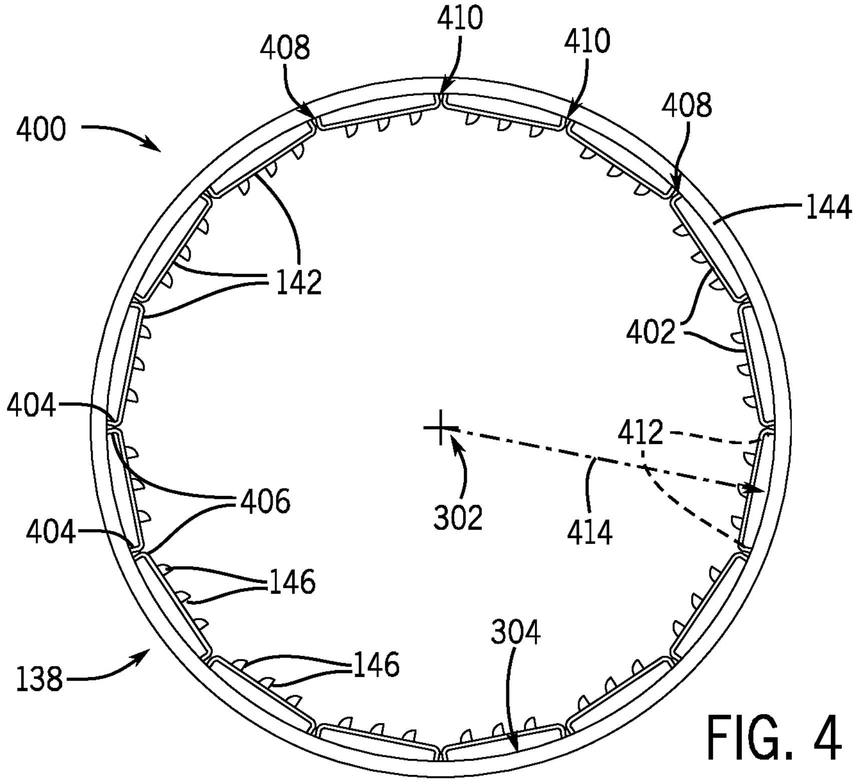
FIG. 4 is a top plan view of the modular shredder ring of FIG. 3.
Figure 5:
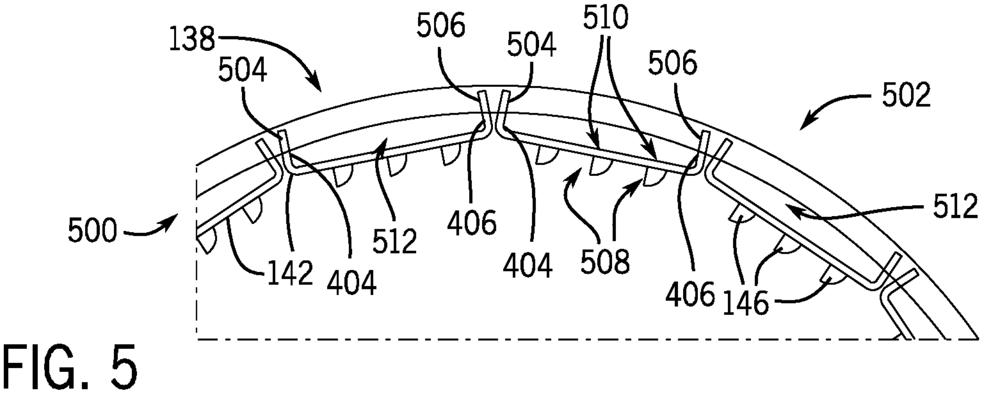
FIG. 5 is an additional cutaway top plan view of a portion of the modular shredder ring of FIG. 3 and FIG. 4, with an outer cylindrical housing of the modular shredder ring being illustrated as transparent.

Turning to FIG. 3 and FIG. 4, respectively, a front perspective (or isometric) view 300 and a top plan view 400, respectively, of the modular shredder ring 138 are shown. Further referring to FIG. 5, an additional cutaway top plan view 500 of a portion 502 of the modular shredder ring 138 is provided so as to illustrate in more detail how the shredder modules 142 interface the outer cylindrical housing 144 of the modular shredder ring. The modular shredder ring 138 is shown in FIG. 3, FIG. 4, and FIG. 5 in a manner that is separate or independent from the other portions of the food waste disposer 100, so as to show in more detail the shredder modules 142 and outer cylindrical housing 144 of the modular shredder ring 138 and how those components are assembled with one another in the present embodiment.

As shown in FIG. 3 and FIG. 4, the modular shredder ring 138 generally extends circumferentially around a central axis 302 of the modular shredder ring, which coincides with and can be considered the same as the central axis 150 of the food waste disposer 100 when the modular shredder ring is implemented as part of the food waste disposer. Additionally, FIG. 3 and FIG. 4 both show the outer cylindrical housing 144 and the plurality of shredder modules 142 that are fixedly coupled to and supported in relation to that outer cylindrical housing. In the present example embodiment, the plurality of shredder modules 142 are metal and the outer cylindrical housing 144 is plastic, and the plurality of shredder modules are affixed to the outer cylindrical housing so as to extend from and be positioned generally inwardly from an interior cylindrical surface 304 of the outer cylindrical housing, between an upper annular rim 306 and a lower annular rim 308 of the outer cylindrical housing 144.

In the present embodiment, the modular shredder ring 138 particularly includes sixteen (16) of the shredder modules 142 that are respectively positioned, circumferentially-spaced one after another, along the interior cylindrical surface 304 of the outer cylindrical housing 144 around the central axis 302. In alternate embodiments encompassed herein, a modular shredder ring can include more or less than sixteen shredder modules. For example, at least some additional embodiments encompassed herein can have anywhere from eight shredder modules to twenty-four shredder modules.

As shown, each of the shredder modules 142 includes a respective square planar surface 402 and also includes respective first and second end flange portions 404 and 406, respectively. The respective square planar surfaces 402 of the shredder modules 142 are the surfaces of the shredder modules that face radially-inwardly, or generally radially-inwardly, toward the central axis 302 of the modular shredder ring 138. Further, the respective square planar surfaces 402 constitute the primary interfacing surfaces that contact or interact with food material, water, or other material that enters the food waste disposer and particularly the grinding section 112 thereof.

The respective first end flange portion 404 of each of the shredder modules 142 extends from a respective first edge 408 of the respective square planar surface 402 of the respective shredder module in a manner that is substantially perpendicular to the respective square planar surface. Also, the respective second end flange portion 406 of each of the shredder modules 142 extends from a respective second edge 410 of the respective square planar surface 402 of the respective shredder module in a manner that is substantially perpendicular to the respective square planar surface, and that is parallel to the manner in which the respective first end flange portion 404 of the respective shredder module extends from the respective square planar surface. The respective first and second edges 408 and 410 of each of the shredder modules 142 are on respective opposite sides of the respective square planar surface 402 of the respective shredder module, and generally extend in directions that are parallel to the central axis 302.

Although in the present embodiment the shredder modules 142 respectively include the respective square planar surfaces 402, in other embodiments the shredder modules can have other surfaces that are not necessarily square or planar. For example, in some alternate embodiments, the shredder modules can include primary interfacing surfaces that are rectangular (other than square), or that have some other shape (e.g., oval), and/or primary interfaces that are curved (e.g., concave) rather than planar. Further, in other embodiments, the shredder modules can include other portions or formations in addition to, or instead of, the first and second end flange portions 404 and 406. For example, in some such other embodiments, the shredder modules can include more than two such flange portions. Also for example, in some other embodiments, the primary interfacing surfaces can be convex, with ends that effectively take the place of the first and second end flange portions 404 and 406.

Further as shown in FIG. 3, FIG. 4, and FIG. 5, each of the respective shredder modules 142 in the present embodiment is positioned between a respective pair of neighboring ones of the shredder modules arranged along the interior cylindrical surface 304. More particularly, the respective first end flange portion 404 of each of the shredder modules 142 is positioned proximate to the respective second end flange portion 406 of a respective first neighboring one of the shredder modules. Also, the respective second end flange portion 406 of each of the shredder modules 142 is positioned proximate to the respective first end flange portion 404 of a respective second neighboring one of the shredder modules.

Each of the shredder modules 142 is positioned relative to the interior cylindrical surface 304 so that the respective shredder module (and particularly the respective square planar surface 402 of the respective shredder module) extends along a respective arc portion 412 (one example of which is identified in FIG. 4) of the interior cylindrical surface 304, radially-inwardly of that respective arc portion relative to the central axis 302 of the modular shredder ring 138. The respective arc portion 412 along which each respective one of the shredder modules 142 is positioned is different from the respective arc portions 412 along which the other respective ones of the shredder modules 142 are positioned—that is, the different shredder modules are respectively positioned at different locations along the interior cylindrical surface 304. Further, each of the square planar surfaces 402 extends in a manner that is generally perpendicular to a respective radius 414 (one example of which is shown by a dashed line in FIG. 4) extending from the central axis 302 of the modular shredder ring 138 outward toward the interior cylindrical surface 304 that passes through a center of the respective square planar surface.

The additional cutaway top plan view 500 of FIG. 5 particularly presents the portion 502 of the modular shredder ring 138 in a manner in which the outer cylindrical housing 144 is illustrated as transparent, so that it is possible to visualize how the outer cylindrical housing 144 is overmolded around several of the shredder modules 142 so that those shredder modules are fixedly coupled to and supported in relation to the outer cylindrical housing. (In this regard, it should be appreciated that FIG. 5 can also be viewed as substantially showing a cross-sectional-view of the portion 502 of the modular shredder ring taken along a plane that is perpendicular to the central axis 302, midway between the upper annular rim 306 and lower annular rim 308.) As illustrated, the outer cylindrical housing 144 particularly is overmolded so as to extend around (and/or encase) respective end portions 504 of the respective first end flange portions 404 of each of the shredder modules 142 and also respective end portions 506 of the respective second end flange portions 406.

In the present embodiment of FIG. 1, FIG. 2, FIG. 3, FIG. 4, and FIG. 5, the respective first contacting formations 146 of each of the shredder modules 142 include six of the first contacting formations, arranged in three pairs of the first contacting formations spaced between the respective first edge 408 and the respective second edge of the respective shredder module on which the respective first contacting formations are provided (with the respective middle pair of the respective first contacting formations of each of the shredder modules being positioned slightly closer to the lower annular rim 308 of the respective shredder module than the respective other pairs of first contacting formations that are closer to the respective first edge and second edge of the respective shredder module). Correspondingly, the respective spaces 148 of each of the shredder modules 142 include six of the spaces, where each of the spaces is defined by a corresponding one of the first contacting formations. Further, in the present example embodiment, each of the first contacting formations 146 of each of the shredder modules 142 takes a particular form, namely, the form of a shell-shaped surface (or quarter-sphere surface) that protrudes inwardly away from the respective square planar surface 402 on which the respective first contacting formation is formed, generally toward the central axis 302 and away from the interior cylindrical surface 304.

The respective first contacting formations 146 having the respective shell-shaped surfaces establish the respective spaces 148, which in the present embodiment take the form of respective substantially-semicircular channels that extend within the respective shell-shaped surfaces from respective locations 508 that are positioned generally inward of the respective square planar surfaces 402 of the respective shredder modules 142 on which those respective first contacting formations 146 are provided, to locations 510 along the square planar surfaces. By virtue of these substantially-semicircular channels forming the spaces 148, the respective locations 508 along the respective square planar surfaces 402 of the respective shredder modules 142 (e.g., locations positioned between those square planar surfaces and the central axis 302) are fluidly coupled not only to the locations 510 but also to respective hollow regions 512 existing between the respective square planar surfaces 402 and the outer cylindrical housing 144.

Given this configuration of the modular shredder ring 138, it should be appreciated that, when the food waste disposer 100 including the modular shredder ring is operated, the food scraps (or food media) received by the food waste disposer are comminuted or ground into particles of desired small size at least in part due to contact between the food scraps and the first contacting formations 146. Upon attaining such desired small size, the particles and associated water (or other fluids) then pass through the respective spaces 148 to the respective hollow regions 512. Due to the particular shapes of the spaces 148 in the present embodiment, the particles and associated water (or other fluids) generally pass circumferentially and radially outward through those spaces to reach the hollow regions 512. Additionally, upon reaching the hollow regions 512, the particles and associated water (or other fluids) then further proceed downward (e.g., toward the upper surface 156 of the UEF 154 as described earlier) and further circumferentially and radially outward so as to reach the primary outlet 116, by which those particles and associated water (or other fluids) exit the food waste disposer 100.

Figure 6:
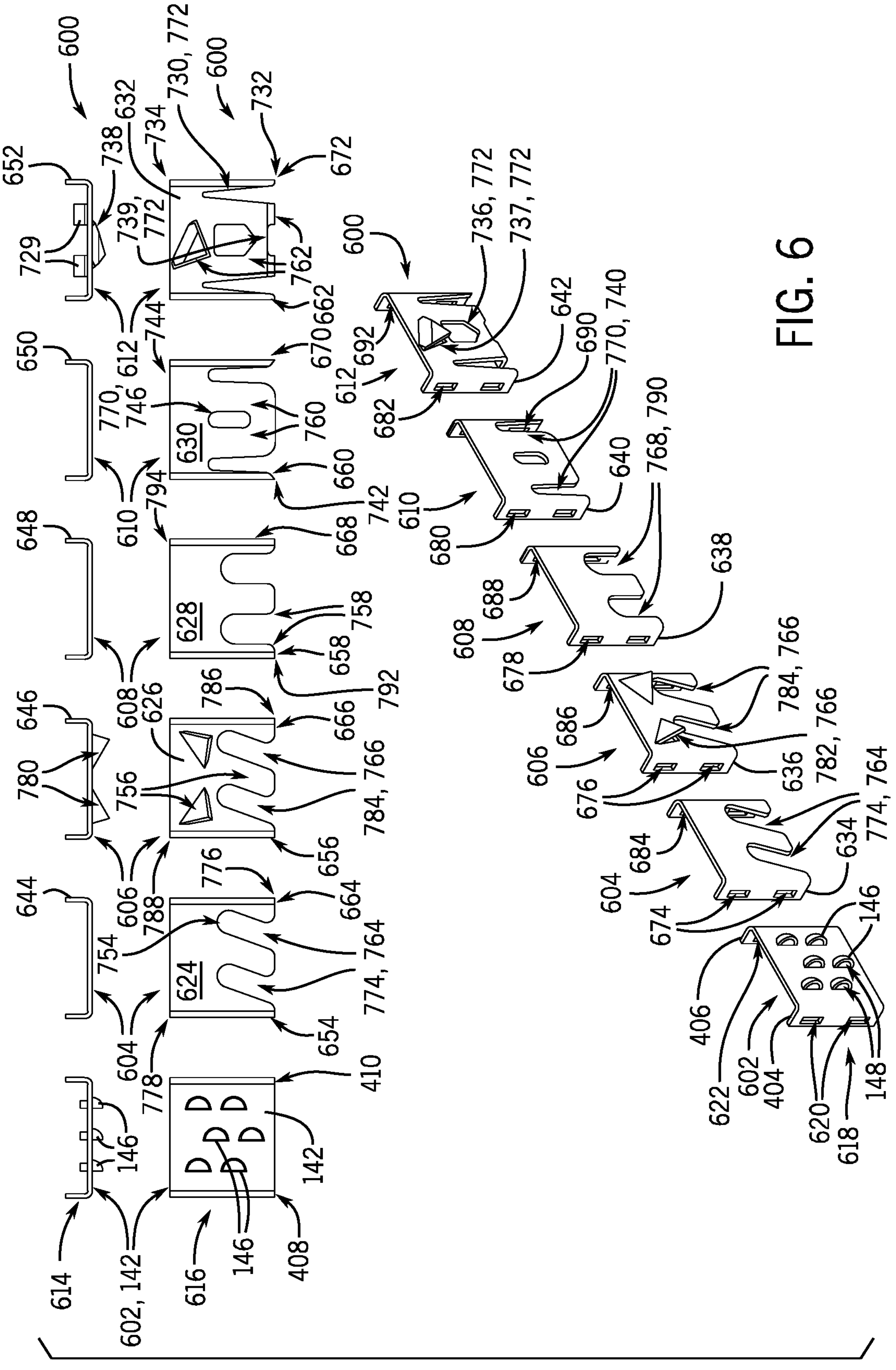
FIG. 6 provides each of a front elevation view, a top plan view, and a front perspective view of a plurality or series of shredder modules of different types, one of which is a shredder module of a type included in the modular shredder ring of FIG. 3, FIG. 4, and FIG. 5.

Turning to FIG. 6, notwithstanding the above description regarding the modular shredder ring 138 having the plurality of shredder modules 142 each having the first contacting formations 146 with the shell-shaped surfaces that form the spaces 148, the present disclosure is intended to encompass numerous other embodiments of modular shredder rings have any of a variety of different types of shredder modules with any of a variety of different types of contacting formations and/or any of a variety of different types of spaces. FIG. 6 particularly illustrates a plurality of shredder modules shown as a series of shredder modules 600 including first, second, third, fourth, fifth, and sixth shredder modules 602, 604, 606, 608, 610, and 612, respectively. In this regard, FIG. 6 particularly provides a top plan view 614, a front elevation view 616, and a front perspective view 618 of the series of shredder modules 600.

As will be appreciated from a comparison of the first shredder module 602 with the shredder modules 142 described above as being implemented on the modular shredder ring 138, the first shredder module 602 constitutes one of the shredder modules 142. Thus, the first shredder module 602 again includes a respective one of the square planar surfaces 402, a respective one of the first end flange portions 404 extending from a respective one of the first edges 408, a respective one of the second end flange portions 406 extending from a respective one of the second edges 410, and a respective set of six of the first contacting formations 146 respectively having shell-shaped surfaces and respectively providing respective ones of the spaces 148. As is particularly apparent from the front perspective view 618 showing the first shredder module 602, the first end flange portion 404 also includes a first pair of additional rectangular openings 620 that are arranged one above the other along that first end flange portion, and likewise the second end flange portion 406 also includes a second pair of additional rectangular openings 622 that are arranged one above the other along that second end flange portion. It should be appreciated that, although not shown in FIG. 3, FIG. 4, and FIG. 5, each of the shredder modules 142 also includes respective pairs of the additional rectangular openings 620 and 622 on the respective first and second end flange portions 404 and 406 of the respective shredder module.

Each of the second, third, fourth, fifth, and sixth shredder modules 604, 606, 608, 610, and 612 is similar to the first shredder module 602 in that each of the second, third, fourth, fifth, and sixth shredder modules also includes a respective square planar surface 624, 626, 628, 630, and 632, respectively, a respective first end flange portion 634, 636, 638, 640, and 642, respectively, and a respective second end flange portion 644, 646, 648, 650, and 652, respectively. Again, the respective first end flange portions 634, 636, 638, 640, and 642 extend respectively from respective first edges 654, 656, 658, 660, and 662, respectively, of the respective square planar surfaces 624, 626, 628, 630, and 632, respectively, in a manner that is perpendicular to the respective square planar surfaces. Likewise, the respective second end flange portions 644, 646, 648, 650, and 652 extend respectively from respective second edges 664, 666, 668, 670, and 672, respectively, of the respective square planar surfaces 624, 626, 628, 630, and 632, respectively, in a manner that is perpendicular to the respective square planar surfaces and that is parallel to the manner in which the respective first end flange portions of the respective shredder modules extend from the respective square planar surfaces. Further, each of the respective first end flange portions 634, 636, 638, 640, and 642 also includes a respective first pair of additional rectangular openings 674, 676, 678, 680, and 682, respectively, and each of the respective second end flange portions 644, 646, 648, 650, and 652 also includes a respective second pair of additional rectangular openings 684, 686, 688, 690, and 692, respectively.

Notwithstanding these similarities, the second, third, fourth, fifth, and sixth shredder modules 604, 606, 608, 610, and 612 differ from the first shredder module 602 in that, rather than having the first contacting formations 146 that partly or entirely define the spaces 148, those respective shredder modules respectively have second, third, fourth, fifth, and sixth contacting formations 754, 756, 758, 760, and 762, respectively, which respectively partly or entirely define second, third, fourth, fifth, and sixth spaces 764, 766, 768, 770, and 772, respectively. More particularly as shown, the second contacting formations 754 of the second shredder module 604 are configured to form a pair of upside-down U-shaped openings 774 that constitute the second spaces 764. Each of the pair of the upside-down U-shaped openings 774 slopes generally away from the first edge 654 of the square planar surface 624 toward the second edge 664 of that square planar surface as those respective openings extend upward from a bottom edge 776 of the square planar surface 624 toward (but not up to) a top edge 778 of that square planar surface.

Similar to the second contacting formations 754, the third contacting formations 756 of the third shredder module 606 also form a pair of upside-down U-shaped openings 784 that slope generally away from the first edge 656 of the square planar surface 626 toward the second edge 666 of that square planar surface as those respective openings extend upward from a bottom edge 786 of the square planar surface 626 toward (but not up to) a top edge 788 of that square planar surface. The third contacting formations 756 not only include portions of the square planar surface 626 that define the upside-down U-shaped openings 784, but also include inwardly-protruding triangular flange formations 780. The upside-down U-shaped openings 784, along with additional triangular openings 782 formed by the triangular flange formations 780, constitute the third spaces 766 of the third shredder module 606.

Additionally as shown in FIG. 6, with respect to the fourth shredder module 608, the fourth contacting formations 758 are configured to form a pair of upside-down U-shaped openings 790 that constitute the fourth spaces 768. Each of the pair of the upside-down U-shaped openings 790 extends vertically upward from a bottom edge 792 of the square planar surface 628 toward (but not up to) a top edge 794 of that square planar surface, between the first edge 658 and the second edge 668 of that square planar surface. Thus, in contrast to the upside-down U-shaped openings 774 and 784, the upside-down U-shaped openings 790 are not sloped.

Further, with respect to the fifth shredder module 610, the fifth contacting formations 760 are configured to form a pair of upside-down U-shaped openings 740. Each of the pair of the upside-down U-shaped openings 740 extends vertically upward from a bottom edge 742 of the square planar surface 630 toward (but not up to) a top edge 744 of that square planar surface. In contrast to the upside-down U-shaped openings 790, the openings 740 are narrower than the openings 790, and the openings 740 extend closer to the top edge 744 than the openings 790 extend toward the top edge 794. Also, although the upside-down U-shaped openings 790 are generally spaced inwardly away from the first and second edges 658 and 668, the upside-down U-shaped openings 740 are respectively located adjacent to the first and second edges 660 and 670. The fifth contacting formations 760 not only include portions of the square planar surface 630 that define the upside-down U-shaped openings 740, but also include portions that define an intermediate oval opening 746 positioned between those openings 740 generally within the center of the square planar surface 630. The upside-down U-shaped openings 740, along with oval opening 746, constitute the fifth spaces 770 of the fifth shredder module 610.

Finally, with respect to the sixth shredder module 612, the sixth contacting formations 762 are configured to form a pair of upside-down V-shaped openings 730. Each of the pair of the upside-down V-shaped openings 730 extends vertically upward from a bottom edge 732 of the square planar surface 632 toward (but not up to) a top edge 734 of that square planar surface. Although V-shaped rather than U-shaped, the upside-down V-shaped openings 730 otherwise are configured in a manner that is substantially similar to the manner in which the upside-down U-shaped openings 740 are configured in terms of how the openings 730 are positioned along the square planar surface 632 by comparison with how the openings 740 are positioned along the square planar surface 630, and the openings 730 have an extent between the bottom and top edges 732 and 734 that is substantially the same as the extent of the openings 740 between the bottom and top edges 742 and 744.

The sixth contacting formations 762 not only include portions of the square planar surface 632 that define the upside-down V-shaped openings 730, but also include portions that define an intermediate pentagonal opening 736 positioned between those openings 730 generally within the center of the square planar surface 632, and portions that define a dimple 739 along the bottom edge 744, as well as an inwardly-protruding triangular flange formation 738 positioned between the intermediate pentagonal opening 736 that forms an additional triangular opening 737. The upside-down V-shaped openings 730, along with pentagonal opening 736, the dimple 739, and the additional triangular opening 737, constitute the sixth spaces 772 of the sixth shredder module 612. Further as shown, the sixth contacting formations 762 of the sixth shredder module 612 also includes additional tabs 729 that extend from the bottom edge 742 in a manner perpendicular to the square planar surface 632, generally in the same direction as the first and second end flange portions 642 and 652, on opposite sides of the dimple 739, so as to further define the dimple.

Notwithstanding the example first, second, third, fourth, fifth, and sixth shredder modules 602, 604, 606, 608, 610, and 612 shown in FIG. 6, it should be recognized that the present disclosure also includes numerous other embodiments of shredder modules as well. For example, the present disclosure includes other embodiments of shredder modules that are inverted in terms of the arrangement of contacting formations or spaces relative to those of the shredder modules described above. Further for example in this regard, the present disclosure also includes shredder modules that are inverted relative to the second shredder module 604, particularly in that such an inverted shredder module has spaces that slope in the opposite direction (e.g., from the second edge 664 to the first edge 654 as one proceeds upward from the bottom edge 776 rather than from the front edge to the second edge as shown in FIG. 6). Additionally for example, the present disclosure encompasses numerous other embodiments of shredder modules having any of a variety of configurations or numbers of contacting formations and/or spaces.

Further, although the modular shredder ring 138 of FIG. 1, FIG. 2, FIG. 3, FIG. 4, and FIG. 5 includes sixteen of the shredder modules 142 of the type of the first shredder module 602 shown in FIG. 16, the present disclosure also encompasses numerous other embodiments of modular shredder rings having different shredder modules. For example, the present disclosure encompasses embodiments of modular shredder rings having sixteen of the second shredder modules 604, or sixteen of the third shredder modules 606, or sixteen of the fourth shredder modules 608, or sixteen of the fifth shredder module 610, or sixteen of the sixth shredder modules 612. Also for example, as already noted previously, the present disclosure also includes embodiments having greater or lesser than sixteen shredder modules.

Additionally, the present disclosure also includes embodiments of modular shredder rings having a combination of different types of shredder modules arranged along the interior cylindrical surface 304. For example, depending upon the embodiment of the modular shredder ring, any given modular shredder ring can have a plurality of shredder modules that respectively take the form or forms of any one or more shredder modules of any of the different types of the first, second, third, fourth, fifth, and sixth shredder modules 602, 604, 606, 608, 610, or 612. Also, the present disclosure encompasses embodiments of modular shredder rings in which any one or more of the shredder modules 142 of the type of the first shredder module 602 are replaced with any of the shredder modules of the different types of the second, third, fourth, fifth, and sixth shredder modules 604, 606, 608, 610, or 612. Further for example, in one additional embodiment encompassed herein, the modular shredder ring will have eight shredder modules that are of the type of the first shredder module 602 and eight shredder modules that are of the type of the second shredder module 604, with shredder modules of the first type alternating with shredder modules of the second type along the interior cylindrical surface 304.

In view of the above discussion, it should be appreciated that, in the present example embodiment, the first, second, third, fourth, fifth, and sixth shredder modules 602, 604, 606, 608, 610, and 612 can be referred to herein as modules insofar the different ones of the shredder modules can be substituted in place of, or replaced by, other ones of the shredder modules, including shredder modules of different types. Correspondingly, the modular shredder ring 138 can be referred to as a modular shredder ring because it includes one or more of these shredder modules, which can take the place of one another.

In the present embodiment, the ability to substitute or replace one of the shredder modules with another of the shredder modules (possibly of a different type) is particularly enhanced by the fact that, in the present embodiment, the various ones of the first, second, third, fourth, fifth, and sixth shredder modules 602, 604, 606, 608, 610, and 612 share in common certain external dimensions. In particular, in the present embodiment, the respective square planar surfaces 402, 624, 626, 628, 630, and 632 are all equal in size, the respective first end flange portions 404, 634, 636, 638, 640, and 642 are all equal in size and shape, and the respective second end flange portions 406, 644, 646, 648, 650, and 652 are all equal in size and shape. Notwithstanding the above discussion, the present disclosure also encompasses embodiments in which a modular shredder ring can include shredder modules that have different respective external dimensions.

In the embodiments of FIG. 1, FIG. 2, FIG. 3, FIG. 4, FIG. 5, and FIG. 6, it is envisioned that the shredder modules (e.g., shredder modules of any of the types shown in FIG. 6) are supported by the outer cylindrical housing 144 insofar as the outer cylindrical housing is plastic that is overmolded around the shredder modules, which are metal. In such embodiments, it is not or may not be possible to replace (or replace easily) one shredder module that is initially supported by the outer cylindrical housing 144 with another shredder module, by removing the one shredder module and inserting the other shredder module. Thus, in such embodiments, to achieve variation in the shredder modules that are implemented within a given food waste disposer, it is or may be necessary to remove entirely one modular shredder ring having a first plurality of shredder modules from the given food waste disposer and to replace that one modular shredder ring with another modular shredder ring having a second plurality of shredder modules differing from the first plurality of shredder modules. In such embodiments, therefore, the overall modular shredder rings (in addition to or instead of the shredder modules) may be considered modules to be implemented within remaining portions of the food waste disposer, and the overall food waste disposer may be considered to be a modular device or system.

Although at least some embodiments encompassed herein are ones in which modular shredder rings have shredder modules that are coupled to outer cylindrical housings by overmolding of the outer cylindrical housing with respect to the shredder modules, in other embodiments the modular shredder rings can have shredder modules that are coupled to outer cylindrical housings in other manners. For example, in some alternate example embodiments, shredder modules are coupled or attached to an outer cylindrical housing by ultrasonic welding of the shredder modules and outer cylindrical housing with one another. In some such embodiments, both the shredder modules and the outer cylindrical housing are made of plastic (or different types of plastic(s)).

Figure 7:
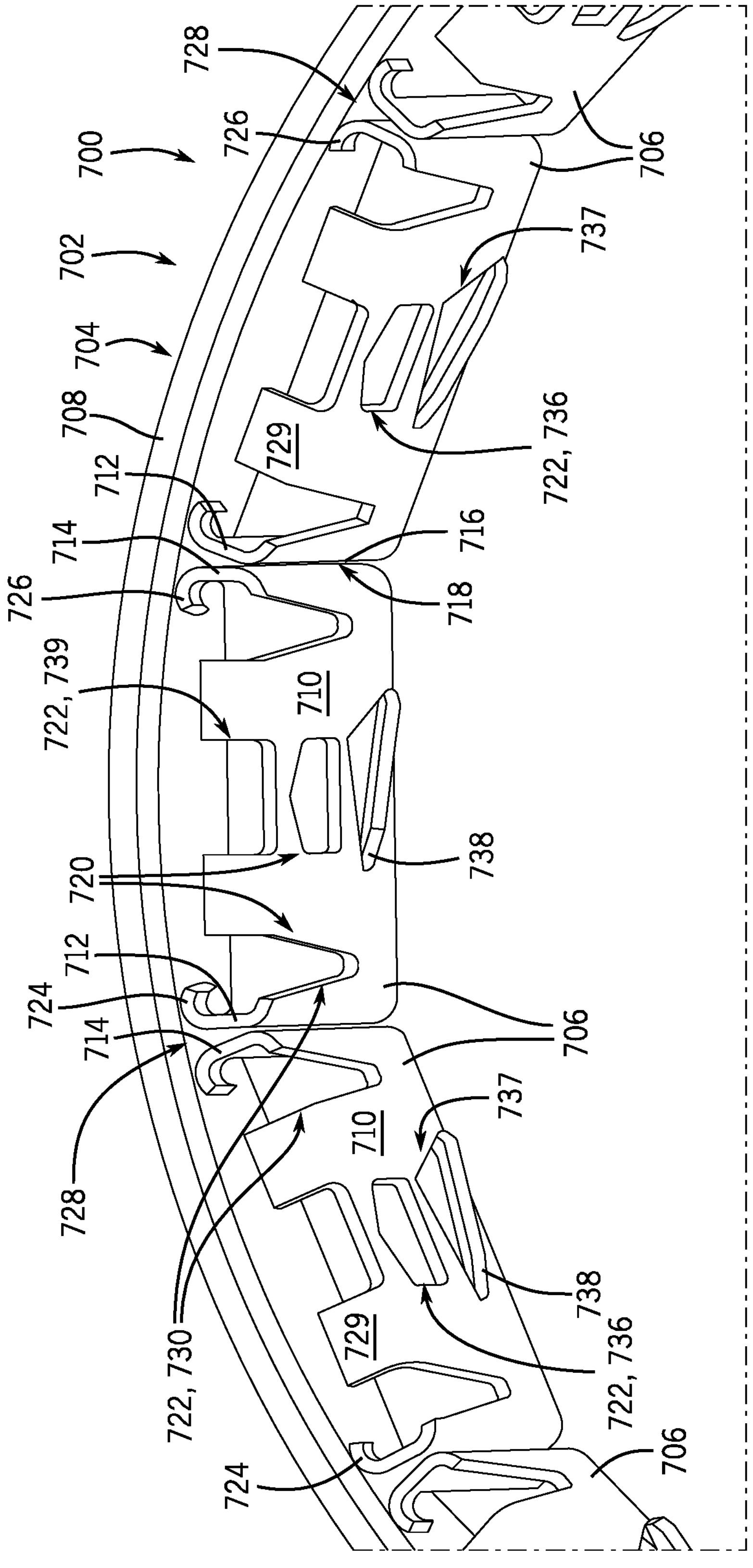
FIG. 7 shows a cutaway front perspective (or isometric) view of a portion of an alternate embodiment of a modular shredder ring differing from the modular shredder ring of FIG. 3, FIG. 4, and FIG. 5.

Also for example, in some alternate example embodiments, the shredder modules can be coupled to the outer cylindrical housing by snapping the shredder modules into position relative to (so as to be coupled to) the outer cylindrical housing. Further in this regard, FIG. 7 shows a cutaway front perspective (or isometric) view 700 of a portion 702 of an alternate embodiment of a modular shredder ring 704 that includes a plurality of shredder modules 706 that are fixedly supported in relation to an outer cylindrical housing 708 of the modular shredder ring.

In this example embodiment, each of the shredder modules 706 has form that is largely similar to that of the sixth shredder module 612 shown in FIG. 6. In particular, each of the shredder modules 706 has a respective square planar surface 710 corresponding to the square planar surface 632, and also has respective first and second end flange portions 712 and 714, respectively, which correspond to the first and second end flange portions 642 and 652, respectively. Each of the respective first end flange portions 712 extends from a respective first edge 716 corresponding to the first edge 662, and each of the respective second end flange portions 714 extends from a respective second edge 718 corresponding to the second edge 672.

Also, each of the shredder modules 706 has contacting formations 720 that correspond to the sixth contacting formations 762, and that partly or entirely define spaces 722 that correspond to the sixth spaces 772. By virtue of these contacting formations 720, the spaces 722 in each of the shredder modules 706 again include all of the same spaces as are present as the spaces 772. That is, the spaces 722 in each of the shredder modules 706 include the pair of upside-down V-shaped openings 730, the intermediate pentagonal opening 736, and the dimple 739. Also, the contacting formations 720 again include the inwardly-protruding triangular flange formation 738 that forms the additional triangular opening 737, which also is included among the spaces 722. Further, the contacting formations 720 also include the additional tabs 729 that extend on opposite sides of the dimple 739.

Notwithstanding the above-described similarities between the shredder modules 706 and the sixth shredder module 612, the respective first end flange portions 712 differ from the first end flange portion 642 and respective second end flange portions 714 differ from the second end flange portion 652 in certain respects. In particular, respective first end edges 724 of the respective first end flange portions 712 and respective second edges 726 of the respective second end flange portions 714 curve toward one another. Also, the respective first and second end flange portions 712 and 714 lack any additional rectangular openings corresponding to the additional rectangular openings 682 and 692. Particularly due to the curved configurations of the respective first end edges 724 and respective second end edges 726, each of the shredder modules 706 is configured to slip and snap into corresponding inner cylindrical surface recesses 728 of the outer cylindrical housing 708, so that the shredder modules can be coupled to and retained in position relative to that outer cylindrical housing.

In addition to the above-described embodiments, the present disclosure encompasses numerous other embodiments of modular shredder rings and component parts including different embodiments of shredder modules and/or different embodiments of outer cylindrical housings. Further, it should further be recognized that the present disclosure encompasses other types of waste disposers employing modular shredder rings or shredder modules, and is not limited to food waste disposers.

Also, the present disclosure includes different methods of assembling modular shredder rings, including overmolding one or more shredder modules, coupling one or more shredder modules to a cylindrical ring by ultrasonic welding, or coupling one or more shredder modules to a cylindrical ring by snapping, or by other fastening techniques. Further, in some other embodiments, an outer support structure other than a cylindrical ring is employed to support the shredder modules. Additionally, in another embodiment it is possible that shredder modules can be coupled to one another (e.g., end-to-end) so as to form a ring by themselves, without any additional support structure such as the outer cylindrical ring.

Further, the present disclosure is intended to encompass numerous methods of operating assembling, or implementing waste disposers such as food waste disposers, grinding sections thereof, and/or stationary shredder rings thereof. In one example embodiment encompassed herein, a method of assembling a food waste disposer includes, first, attaching one or more shredder modules to a ring structure to form a modular shredder ring, and then, second, implementing or positioning the modular shredder ring within a housing portion of the food waste disposer (e.g., within the upper enclosure 104).

In another example embodiment encompassed herein, a method of operating (and/or assembling, implementing, and/or modifying) a food waste disposer includes, first, providing the food waste disposer with a first modular shredder ring, then second, removing the first modular shredder ring from a housing of the food waste disposer, and next third, installing a different modular shredder ring within the housing of the food waste disposer, where the different modular shredder ring is either a second modular shredder ring or a modified version of the first modular shredder ring. In at least some such embodiments of the method of operating (or implementing) the food waste disposer, the first modular shredder ring after being removed is modified by removing one or more shredder module(s) from the outer cylindrical housing of the first modular shredder ring and replacing those removed one or more shredder module(s) with one or more other, additional, or different shredder module(s).

Also, in at least some such embodiments of the method of operating the food waste disposer, before the first modular shredder ring is removed, the method also includes making a determination that a nature of food or other material entering the food waste disposer, or another operational circumstance (or circumstances), has or have changed or will be changing such that a different shredder ring having different operational characteristics (e.g., different shredding characteristics) is more appropriate for the operational circumstance(s) (or one or more anticipated future operating circumstances) than the first modular shredder ring. Such a determination can be made, for example, by a microprocessor or other electrical processing device, control device, or circuit based upon sensing signals concerning the food or material entering the food waste disposer as sensed by one or more sensors.

One or more embodiments encompassed herein are advantageous in one or more respects. For example, at least some of the embodiments encompassed herein will allow for a very large number of (practically speaking, effectively infinite) combinations of any of a variety of different types of shredder modules (e.g., different modules of shredder blade design) to be provided on a modular shredder ring, where each shredder module makes up a segment of the modular shredder ring that includes or is formed by multiple shredder modules arranged in a circular formation. Given that any of a variety of different types (and possibly numbers) of shredder modules can be implemented in regard to a modular shredder ring, an installer or user will be able to mix and match different shredder modules (or blade designs) to create a desired grind profile.

Also for example, at least some of the embodiments encompassed herein are advantageous in that the use/implementation of shredder modules or modular shredder rings can make it easier to form or modify a shredder ring to have desired characteristics than it is to form or provide a conventional shredder ring with desired characteristics. Correspondingly, the use/implementation of modular shredder rings or shredder modules within food waste disposers (or other waste disposers) can make it easier to implement or modify a food waste disposer (or other waste disposer) so as to achieve desired operational characteristics than it is to implement or modify a conventional food waste disposer that does not employ modular shredder rings or shredder modules.

Indeed, the use/implementation of shredder modules or modular shredder rings can allow for or create versatility in grind performance and capability for food waste disposers or other waste disposers. For example, if a 2-way design is desired, one can provide two different types of shredder modules on the modular shredder ring that alternate with one another around the modular shredder ring, where one type of shredder module achieves better shredding when the waste disposer is rotated in a first direction and the other type of shredder module achieves better shredding when the waste disposer is rotated in the second direction. In some cases, one can use the same shredder module and alternate the direction of grinding every other module so as to allow for grinding in two directions. Other modules can be developed for specialized grinding characteristics or allow for deflectors to kick objects away so that such objects do not ride around the ring and jam.

It is specifically intended that the present invention not be limited to the embodiments and illustrations contained herein, but include modified forms of those embodiments including portions of the embodiments and combinations of elements of different embodiments as come within the scope of the following claims.

I claim:

1. A food waste disposer comprising:

a housing; and a food conveying section, a motor section, and a grinding section between the food conveying section and the motor section, wherein the food conveying section, the motor section, and the grinding section are all supported by or formed within the housing;

wherein the grinding section includes a rotating plate and a modular shredder ring, the modular shredder ring including an annular support structure and a plurality of shredder modules mounted upon or coupled to the annular support structure, wherein the respective shredder modules of the plurality of shredder modules are respectively positioned along respective different portions of a radially-inwardly-facing annular surface of the annular support structure, and wherein each of the respective shredder modules includes one or more respective first contacting formations that at least partly define one or more respective first spaces.

2. The food waste disposer of claim 1, wherein the respective different portions of the radially-inwardly-facing annular surface of the annular support structure are respective different arc portions.

3. The food waste disposer of claim 1, wherein the shredder modules are coupled to the annular support structure by overmolding of the annular support structure relative to the shredder modules.

4. The food waste disposer of claim 3, wherein the annular support structure is made of a plastic material and the shredder modules are made of one or more metallic materials.

5. The food waste disposer of claim 1, wherein the shredder modules are coupled to the annular support structure by ultrasonic welding of the annular support structure relative to the shredder modules.

6. The food waste disposer of claim 1, wherein the shredder modules are coupled to the annular support structure by snapping the shredder modules relative to the annular support structure.

7. The food waste disposer of claim 1, wherein a first one of the shredder modules can be removed from the annular support structure and then replaced by a first replacement shredder module that is then coupled to the annular support structure, wherein the first replacement shredder module includes additional contacting formations that are different from the respective first contacting formations of the first one of the shredder modules.

8. The food waste disposer of claim 1, wherein each of the shredder modules has a substantially square, planar surface portion having first and second ends and first and second end flange portions respectively integrally formed with the substantially square and planar surface portion at or proximate to the first and second ends, respectively.

9. The food waste disposer of claim 8,
- wherein each of the shredder modules is coupled to the annular support structure by overmolding of the annular support structure in relation to the first and second end flange portions of the shredder modules, and
- wherein each of the shredder modules is mounted upon the annular support structure by coupling of the first and second end flange portions to the annular support structure so that the respective substantially square, planar surface portion is spaced apart from the respective different portion of the radially-inwardly-facing annular surface of the annular support structure.

10. The food waste disposer of claim 1, wherein the plurality of shredder modules includes at least eight and not more than twenty-four of the shredder modules.

11. The food waste disposer of claim 1, wherein the respective first contacting formations of a first one of the shredder modules include one or more of:
- at least one shell-shaped protrusion that protrudes radially-inwardly toward a central axis of the modular shredder ring;
- at least one inwardly-protruding triangular flange formation; and
- a plurality of edges configured to define at least one of the respective first spaces of the first one of the shredder modules.

12. The food waste disposer of claim 1, wherein the respective first contacting formations of a first one of the shredder modules are configured so that the respective first spaces of the first one of the shredder modules include one or more of:
- at least one channel having a substantially semicircular cross-section;
- at least one sloped upside-down U-shaped or V-shaped space;
- at least one non-sloped upside-down U-shaped or V-shaped space;
- a triangular orifice;
- an oval orifice;
- a dimple; and
- a pentagonal orifice.

13. The food waste disposer of claim 1, wherein the respective first contacting formations and respective first spaces, respectively, of a first one of the respective shredder modules are identical to the respective first contacting formations and respective first spaces, respectively, of each other one of the respective shredder modules.

14. The food waste disposer of claim 1, wherein the respective first contacting formations and respective first spaces, respectively, of a first one of the respective shredder modules are different from the respective first contacting formations and respective first spaces, respectively, of a second one of the respective shredder modules.

15. The food waste disposer of claim 14, wherein the respective first contacting formations and respective first spaces, respectively, of each of the first and second ones of the respective shredder modules, are different from the respective first contacting formations and respective first spaces, respectively, of a third one of the respective shredder modules.

16. A modular shredder ring for implementation in a waste disposer, the modular shredder ring comprising:
- an annular support structure; and
- a plurality of shredder modules mounted upon or coupled to the annular support structure,
- wherein the respective shredder modules of the plurality of shredder modules are respectively positioned along respective different portions of a radially-inwardly-facing annular surface of the annular support structure, and
- wherein each of the respective shredder modules includes one or more respective first contacting formations that at least partly define one or more respective first spaces.

17. The modular shredder ring of claim 16, wherein either each of the respective shredder modules shares in common an identical form, or a first one of the respective shredder modules is configured to be different from a second one of the respective shredder modules.

18. A method of operating a food waste disposer, the method comprising:
- providing the food waste disposer with a first modular shredder ring implemented therein, the first modular shredder ring having a first plurality of shredder modules coupled to an annular support structure;
- removing the first modular shredder ring from a housing portion of the food waste disposer;
- installing a different modular shredder ring within the housing portion of the food waste disposer, wherein the different modular shredder ring is either a second modular shredder ring or a modified version of the first modular shredder ring, and wherein the different modular shredder ring or modified version of the first modular shredder ring has a second plurality of shredder modules that at least partly differs from the first plurality of shredder modules.

19. The method of claim 18, further comprising, prior to the providing of the first waste disposer:
- attaching the first plurality of shredder modules to the annular support structure to so as to form the first modular shredder ring; and
- implementing the first modular shredder ring within the housing portion.

20. The method of claim 18, further comprising either:

prior to the removing of the first modular shredder ring, making a determination that one or more operational circumstances have changed or will be changing such that the different modular shredder ring is more appropriate for one or more anticipated future operational circumstances than the first modular shredder ring; or after the removing of the first modular shredder ring, modifying the first modular shredder ring to become the modified version of the first modified shredder ring by removing one or more of the shredder modules of the first plurality of shredder modules from the annular support structure and replacing the removed one or more of the shredder modules with one or more different shredder modules.

* * * * *